United States Patent [19]
Jochems et al.

[11] Patent Number: 5,892,841
[45] Date of Patent: Apr. 6, 1999

[54] PROCESS FOR AUTOMATIC DETECTION OF THE ASSESSABLE AREAS IN IMAGES OF MECHANICAL COMPONENTS

[75] Inventors: Tilman Jochems, Perpignan; Véronique Hélène Marie Pierre Prejean-Lefevre, Sceaux, both of France

[73] Assignee: Societe Nationale D'Etude et de Construction de Moteurs D'Aviation "Snecma", Paris, France

[21] Appl. No.: 731,487

[22] Filed: Oct. 16, 1996

[30] Foreign Application Priority Data

Oct. 18, 1995 [FR] France ................................. 95 12203

[51] Int. Cl.$^6$ ..................................................... G06K 9/00
[52] U.S. Cl. ........................... 382/152; 382/173; 382/270; 382/276
[58] Field of Search ..................................... 382/141, 144, 382/152, 168, 170–173, 209, 217–218, 254, 270–273, 276, 308

[56] References Cited

U.S. PATENT DOCUMENTS

| | | | |
|---|---|---|---|
| 5,050,111 | 9/1991 | Ayata et al. | 364/559 |
| 5,307,421 | 4/1994 | Darboux et al. | 382/145 |
| 5,543,921 | 8/1996 | Uzawa et al. | 356/401 |
| 5,577,131 | 11/1996 | Oddou | 382/173 |

FOREIGN PATENT DOCUMENTS 0 627 693  12/1994  European Pat. Off. .

OTHER PUBLICATIONS

"Real–Time Industrial Visual Inspection: A Review," A. D. H. Thomas et al. Real–Time Imaging; vol. 1, No. 2, Jun. 1, 1995. pp. 139–158.

"Multiprocessing For Industrial Control," John Sylvan. Machine Design; vol. 58, No. 2, Jan. 1986. pp. 67–71.

"An Intelligent Robotic Vision System For Inspection Of Surface Mount PCBS," E. K. Teoh. Decision Aiding For Complex Systems; vol. 1, Oct. 13–16, 1991. pp. 13–17.

*Primary Examiner*—Leo H. Boudreau
*Assistant Examiner*—Bhavesh Mehta
*Attorney, Agent, or Firm*—Oblon, Spivak, McClelland, Maier & Neustadt, P.C.

[57] ABSTRACT

A process for automatic detection of the assessable areas within an image of a mechanical component comprises a first phase during which different areas of at least one reference image are detected by means of manual segmentation, a second phase during which marking parameters for the areas of the reference images are defined and fixed, these marking parameters being simplifying transformations and thresholding intervals for the reference images making it possible to obtain optimal quality of separation of the areas, and a fully automatic third phase during which the area-marking parameters defined and fixed during the first two phases are used to mark the assessable areas of new images, and the exact outline of said areas is determined using the watershed line method.

6 Claims, 5 Drawing Sheets

PROCESS FOR AUTOMATIC DETECTION OF THE ASSESSABLE AREAS IN IMAGES OF MECHANICAL COMPONENTS

BACKGROUND OF THE INVENTION

1. Field of the Invention

The invention relates to a process for automatic detection of the assessable areas in an image of a mechanical component, and is applicable in particular to the X-ray inspection of mechanical components.

2. Summary of the Prior Art

The X-ray inspection of a component is generally carried out from several views making it possible to look at different regions of the component. The images obtained for the various views often exhibit several areas. Certain areas are referred to as non-assessable when they are saturated by very bright or very dark gray levels, or when the contrast therein is not sufficient to allow the detection of defects, or when they do not represent the component; the remaining areas are referred to as assessable and are used to search for any possible defects.

The known methods for determining the assessable areas in an image of a mechanical component generally involve marking the different areas of the image and in then determining the exact outline of the areas by using the so-called watershed line method, WSL for short. The problem with these methods is that they are not fully automatic and require an operator to perform the marking of the areas of the image. The determination of the markers is a tricky operation and must be carried out by an operator skilled in image analysis. The manual methods are particularly lengthy and irksome in the frequent cases in which they are applied to the inspection of mass-produced mechanical components and in which the same processing is to be applied to a series of images depicting the same scene together with objects which may be situated at different locations and/or have variable shapes. Furthermore, the absence of any systematic method for performing the marking of the areas may lead to erroneous interpretations of the images and call into question the reliability of the inspection of the components.

SUMMARY OF THE INVENTION

One object of the invention is to provide a method allowing completely automatic detection of different areas in an image of a mechanical component. Another object is to provide a method allowing automatic determination of a set of markers associated with different areas of the image, these markers having optimized dimensions.

Accordingly, the invention provides a process for automatic detection of the assessable areas in an image of a mechanical component, comprising the steps of:

performing a marking of said areas of the image; and determining the exact outline of said areas by using a method called the watershed line method;

wherein said marking step consists of:

a first phase comprising the step of performing manual segmentation of at least one reference image in order to detect different areas of said reference image;

a second phase comprising the steps of:

defining and applying at least one simplifying transformation to said reference image, determining and optimizing thresholding intervals for said areas of said reference image making it possible to obtain markers characteristic of each area, and fixing the optimized thresholding intervals;

a third phase comprising the step of performing the automatic marking of areas of a new image by applying successively to said new image said simplifying transformation and said optimized thresholding intervals fixed during said second phase.

In the first phase, termed the manual segmentation phase, a description of the images to be segmented is established by using one or more reference images representative of the images to be segmented. The detection of the areas within the reference images is performed by an operator by means of manual segmentation.

In the second phase, termed the marking parameters determination and optimization phase, transformations for simplifying the reference images are defined making it possible to accentuate a contrast or a difference between two or more areas, and intervals for the images are determined and fixed making it possible to obtain markers for the areas detected in the first phase. Each marker is a subset of a single area of the image and has dimensions optimized in such a way as to accelerate the image segmentation process and render it more stable against noise.

In the third phase, areas of new images are automatically marked by applying to these images the simplifying transformations defined in the second phase and by using the parameters fixed during the second phase. After this, the exact outline of the areas is determined by using the so-called watershed line method.

Preferred features and advantages of the invention will become apparent from the following description of a preferred embodiment, given by way of nonlimiting example, with reference to the accompanying drawings.

BRIEF DESCRIPTION OF THE DRAWINGS

FIG. 1b shows an example of a set of markers chosen to detect the various areas within the image of FIG. 1a;

FIG. 4b shows histograms hA and hB of the two areas A and B of the image in FIG. 4a;

DESCRIPTION OF THE PREFERRED EMBODIMENTS

The segmenting of an image consists of splitting an image into several areas and makes it possible to recognize objects or regions of homogeneous appearance.

Figure 1A:
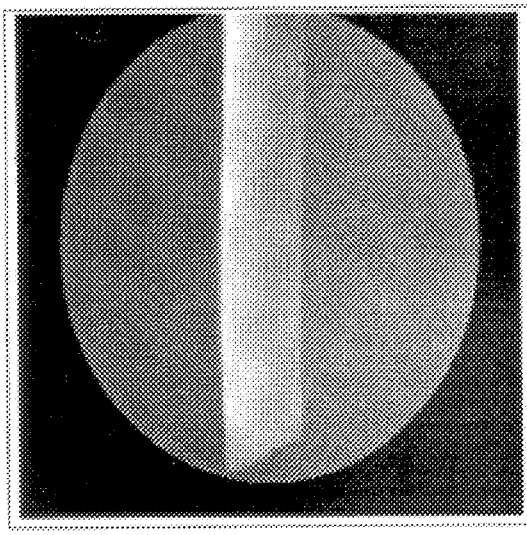
FIG. 1a shows an image of a mechanical component including three areas.

FIG. 1a shows an X-ray image of a solid blade. This image includes three areas, the area in the middle of the image being the blade, the area around the blade being due to the circular field of an intensifier screen, and the black external area corresponding to the mask of the picture-taking camera. In order to segment this image and recognize these three areas by using a WSL method, it is necessary to define a set of markers characteristic of the areas of the image and a transformed image of the original image in which the outlines of the various areas are revealed.

Figure 1B:
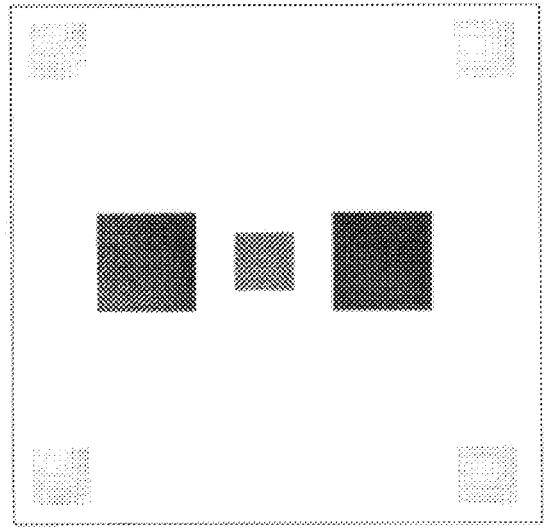

FIG. 1b shows an example of the choice of a set of markers, each marker being characteristic of a single area of the image. The three areas are marked by squares with different gray levels.

Figure 1C:
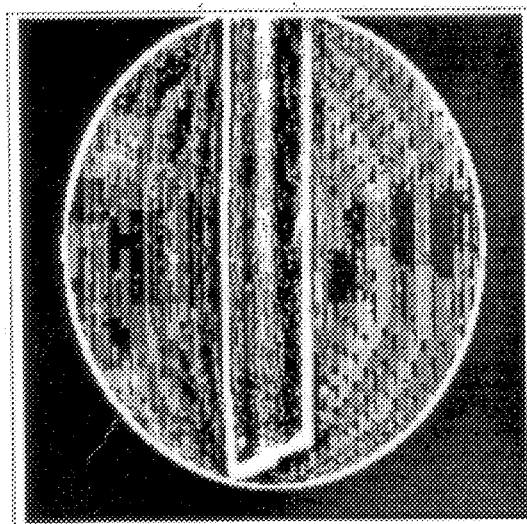
FIG. 1c shows a transformed image of the mechanical component after applying a gradient transformation.

FIG. 1c depicts an image in which the outlines of the various areas appear very sharply in white. This image has been obtained by applying a so-called "morphological gradient" transformation to the original image. This morphological gradient transformation involves carrying out in succession on the original image, a morphological dilatation, a morphological erosion, and a subtraction between the dilated and eroded image.

Figure 1D:
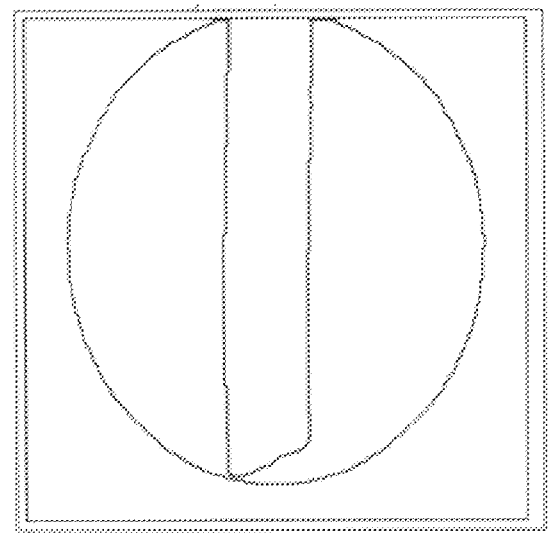
FIG. 1d shows the result of the segmenting of the image of FIG. 1a into three areas, obtained after applying the WSL method in carrying out the process of the invention.

Having defined the set of markers and the transfored image, the segmenting of the original image can then be performed using the WSL method. This consists of stretching the markers while following the relief of the transformed image (regarding the image as a topographical surface) and in determining the exact outlines of the areas within the image. FIG. 1d shows the result of segmenting the original image represented in FIG. 1a after applying the WSL method, using the markers and the transformed image represented respectively in FIGS. 1b and 1c.

Figure 2:
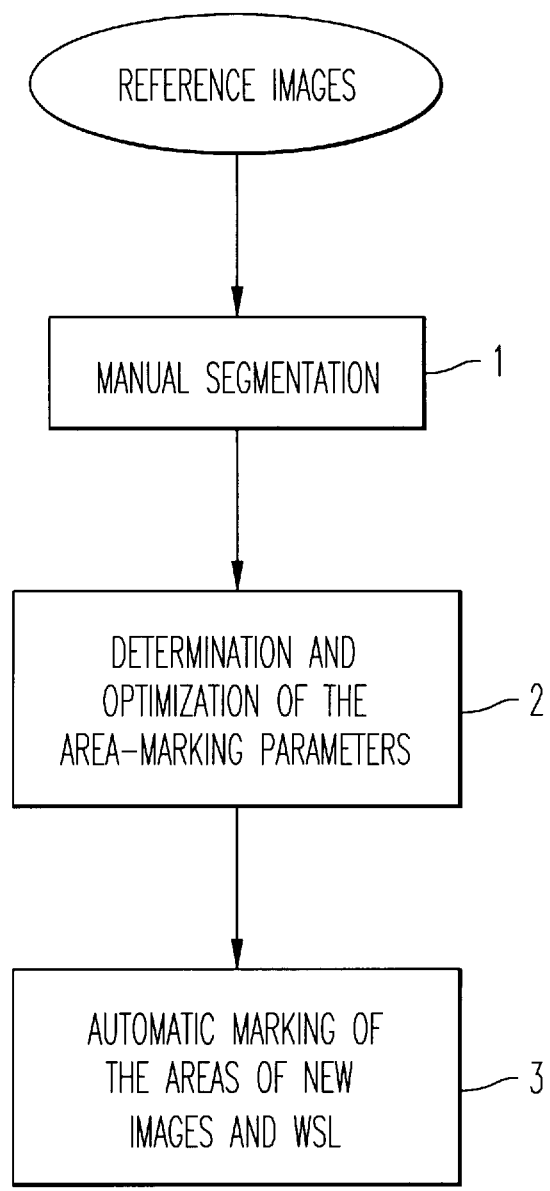
FIG. 2 is schematic diagram of the various stages in the process in accordance with the invention for detecting different areas in an image of a mechanical component.

FIG. 2 represents a schematic diagram of the three main phases of the process in accordance with the invention for detecting different areas within an image of a mechanical component.

The first two phases 1 and 2 are learning phases. In phase 1, manual segmentation of one or more reference images is performed so as to obtain a description of the different areas of these reference images. In phase 2, parameters for marking the areas of the images are determined, optimized and fixed, these marking parameters being the most effective simplifying transformations and image thresholding intervals making it possible to obtain optimum quality of separation of the areas of the reference images. These phases require the presence of an operator, especially to perform segmentation of the reference images and to define the simplifying transformations. The search for the optimum thresholding intervals is performed automatically.

The third phase 3 is a fully automatic phase in which the marking parameters defined and fixed during the second phase are used to mark the corresponding areas of new images. This third phase allows automatic inspection of mass-produced mechanical components without requiring the presence of an operator to perform the marking of the areas of the images. The exact outline of the marked areas of each image is obtained by using the watershed line (WSL) method.

Figure 3A:
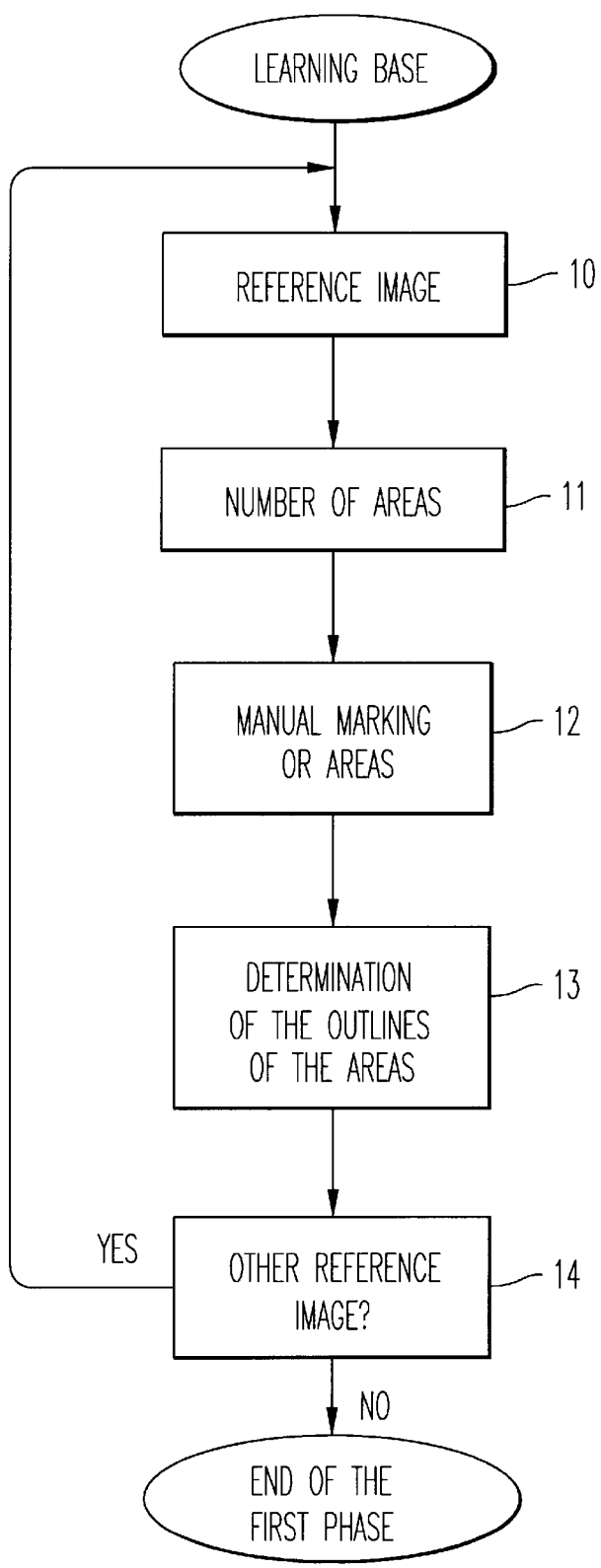
FIG. 3a is a schematic diagram of the steps in the first phase, termed the manual segmentation phase, of the marking stage of the process in accordance with the invention.
Figure 3B:
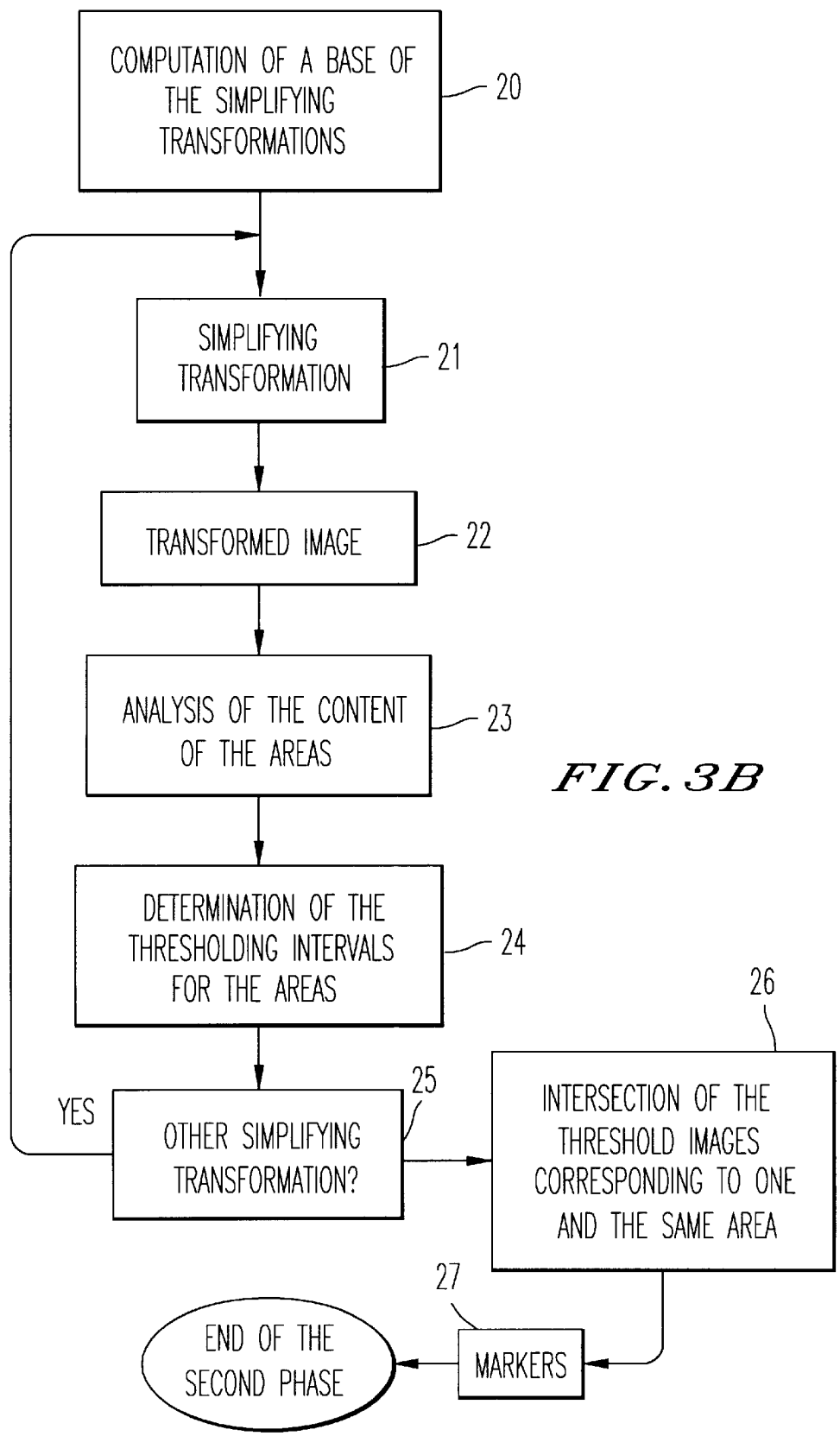
FIG. 3b is a schematic diagram of the steps in the second phase, termed the marking parameters determination and optimization phase, of the marking stage of the process according to the invention.

FIGS. 3a and 3b represent two schematic diagrams corresponding respectively to the first and second phases of the marking process in accordance with the invention. FIG. 3a relates to the first phase, termed the manual segmentation phase, during which reference images stored in a learning base are segmented into different areas by a method of manual segmentation. This first phase includes a first step 10 which comprises selecting a reference image from the learning base, a step 11 during which an operator indicates the number of areas in the selected image, a step 12 during which the operator manually marks the areas on the image by means of a pointer, and a step 13 during which the exact outlines of the marked areas are determined using the watershed line method. The manual segmentation of the reference image is then terminated and a test is performed in a step 14 to determine whether all the images available in the learning base have been segmented. If the test is negative, another reference image is extracted from the learning base and steps 10 to 14 are repeated with this new reference image. If the test is positive the first phase is terminated.

FIG. 3b relates to the second phase of the marking process, termed the marking parameters determination and optimization phase, during which the areas of the reference images determined during the first phase are analysed so as to extract markers having optimized dimensions and zero mutual intersection.

Since the position of the areas in the reference images is known as a result of the manual segmentation performed during the first phase, it is possible to make measurements and compile statistics in each of these areas. In particular, it is possible to calculate histograms which provide information regarding the distribution of gray levels within each area, or to calculate grain sizes which make it possible to ascertain the form of each area. These measurements and statistics are used to determine and optimize markers.

To do this, in a step 20 the images segmented during the first phase are used to compute a base of transformations for simplifying these images. The image simplifying transformations are preferably chosen by the operator in such a way as to accentuate a contrast or a difference between two or more areas of the image. The differences between two or more areas may for example be a difference of shape, or position, or texture etc., which is manifested within the transformed image as a difference of gray levels and which allows the marking of the relevant areas by performing thresholding.

There are many images transformation operations which may be used, such as for example, an identity transformation operation, an erosion operation, a dilatation operation, a Laplacian operation, a top hat operation, a contrast correction operation, a high-pass filter operation, or a low-pass filter operation, etc. These transformation operations may also be combined with one another. The operator chooses, from among all the possible operations, those which advantageously reveal certain characteristics of the image and which thus make it possible to glean the sought-after information.

In general it is necessary to choose several transformations for simplifying the image. While a single transformation makes it possible to enhance differences or a contrast within an image, it can also introduce noise and spurious effects. However, because the noise appears randomly from one transformation to another, the use of several transformations makes it possible to eliminate the noise and retain only the information which appears systematically in all the transformed images.

In the case where a single transformation does make it possible to distinguish all the areas of the image, the operator can limit the base of the simplifying transformations to this one transformation.

When the base of the simplifying transformations is computed, the manual operations of the process are complete, and the determination and optimization of the markers is then performed in a fully automatic manner following the steps described below.

In a step 21, a simplifying transformation is extracted from the transformation base and applied, in a step 22, to one of the reference images.

In a step 23, the content of the areas of the transformed image is analysed, for example by calculating the histograms of these areas and the intersections between two areas are searched for.

In a step 24, the results of the analyses of the content of the areas are used to determine, for each area, a thresholding interval defined by two thresholding boundaries, minimum and maximum respectively, making it possible to separate the areas. The thresholding boundaries are defined in such a way as to optimize the quality of separation between the areas. The detailed steps relating to the determination and optimization of the thresholding boundaries are described in connection with FIG. 4. In a step 25, a test is performed to determine whether all the simplifying transformations have ben applied to the chosen reference image. If the test is negative, steps 21 to 24 are repeated using another simplifying transformation. If the test is positive, a step 26 is carried out for each area, in which the intersection of the thresholding images obtained for each simplifying transformation is calculated, followed by a step 27 in which the results of the intersections relating to the various areas define the optimum markers for these areas in respect of the chosen reference image. The set of marking operations defined in steps 20 to 27 is performed for each of the reference images belonging to the learning base, and the final markers adopted are obtained by calculating for each marker the intersection of the corresponding thresholding intervals determined for each of the reference images.

Figure 4A:
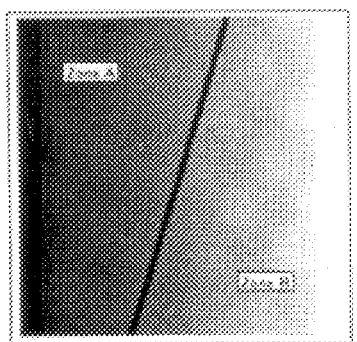
FIG. 4a shows an image including two areas A and B.
Figure 4B:
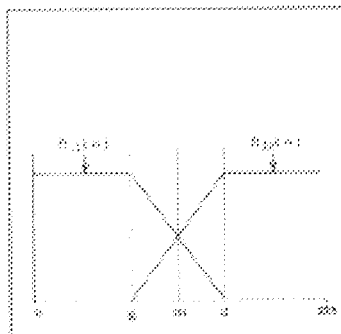
Figure 4C:
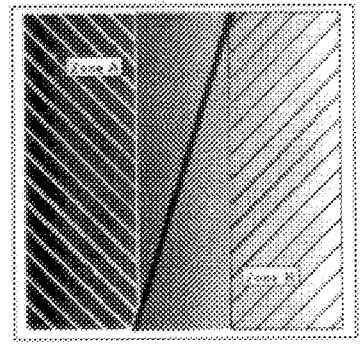
FIG. 4c shows an image of two markers obtained after thresholding the image represented in FIG. 4a; and, FIG. 5 is a schematic diagram of the steps for determining and optimizing the thresholding boundaries of an image including two areas A and B in a process in accordance with the invention.

FIGS. 4a, 4b and 4c illustrate one example of how the boundaries of the thresholding intervals can be determined for two areas.

FIG. 4a represents an image which includes two areas A and B; FIG. 4b represents histograms hA and hB of the areas A and B; and FIG. 4c represents an image of the two markers obtained after thresholding the image represented in FIG. 4a.

The two histograms corresponding to the two areas A and B of the image show that a non-zero intersection exists between the two areas. The common part of the two histograms is located between gray levels denoted g and d, g and d lying between 0 and 255 with d being greater than g. In this common part, there exist image points, termed pixels, of the area A which are brighter than certain points of area B whereas, overall, area A is darker than area B.

These two histograms also show that the image points which have gray levels lying between 0 and g belong solely to area A, and that the image points which have gray levels lying between d and 255 belong solely to area B. In this example, the thresholding intervals which make it possible to define markers which are characteristic of a single area and which are as large as possible are therefore the intervals [0, g] for area A and [d, 255] for area B.

In order to define the markers for each area, the invention involves searching for the thresholding boundaries g and d which enable a maximum number of gray levels to be considered in each area and which make it possible to obtain a zero intersection between the gray levels of the two areas.

Figure 5:
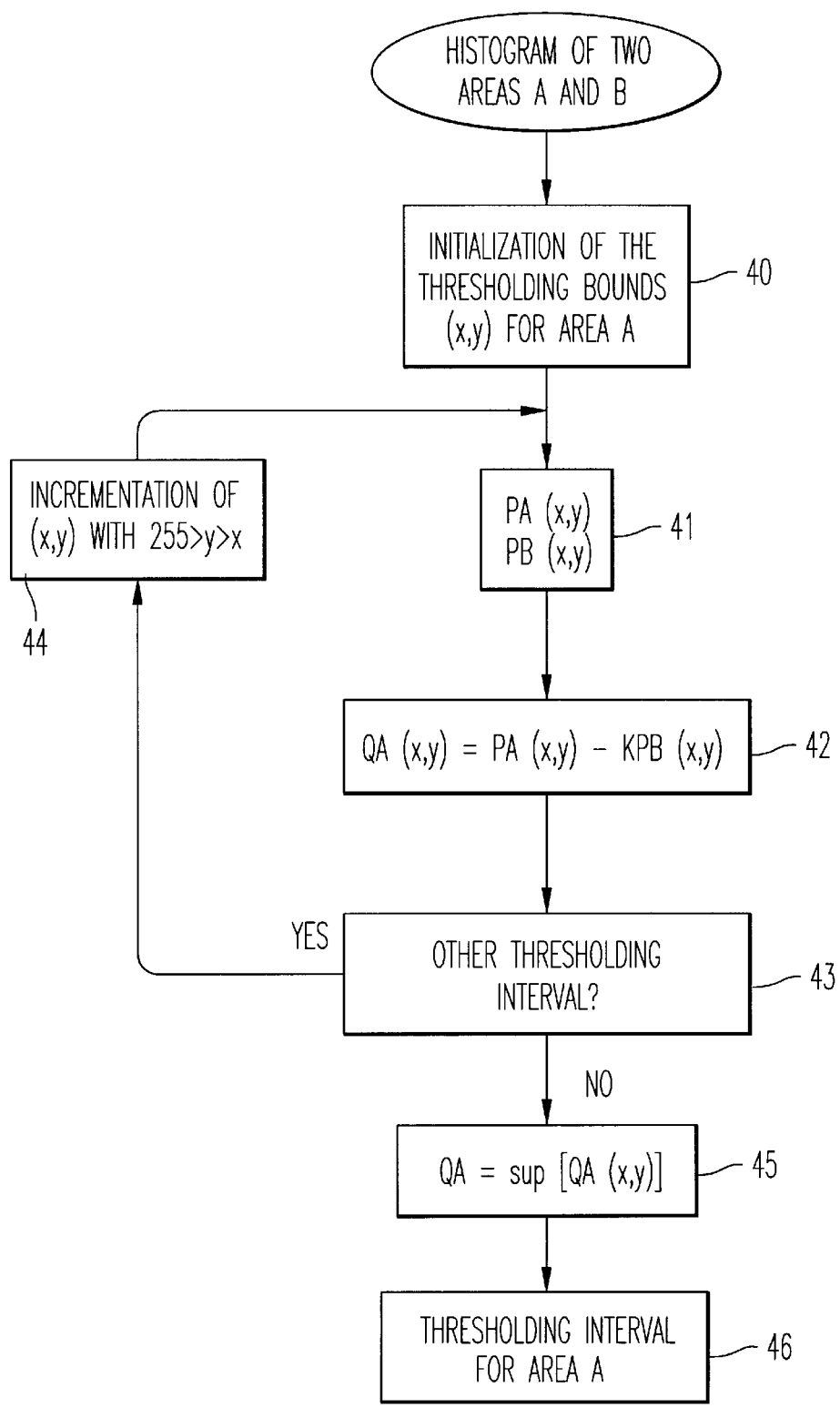

FIG. 5 represents a schematic diagram of the various steps in determining and optimizing the thresholding boundaries of an image which includes two areas A and B. In this figure, only the steps relating to the marking of area A are represented, the process being identical for the marking of area B.

The search for the thresholding boundaries is performed by successive approximations starting from the histograms of the two areas A and B and after an initialization step 40, by calculating, in a step 41, for each pixel of area A and of area B, the probability that this pixel has a gray level lying between two thresholding boundaries x and y, y being greater than x, and x representing area A or B. This probability PX (x, y) is equal to the sum of the histograms of the pixels n belonging to area X and having a gray level lying between the thresholding boundaries x and y, divided by the sum of the histograms of all the pixels n, regardless of their gray level, lying between 0 and 255.

$$PX(x,y) = \left[ \sum_{n=x}^{n=y} hX(n) \right] / \left[ \sum_{n=0}^{n=255} hX(n) \right]$$

To obtain a large marker characteristic solely of area A, it is necessary to search for the values of the thresholding boundaries x, y for which the probability PA (x, y) is a maximum and PB (x, y) is a minimum.

The values of x, y are determined by successive approximations by considering, in a step 42, the disparity QA (x, y) between the two probabilities PA (x, y) and PB (x, y), this disparity being a measure of the quality of the separation of areas A and B corresponding to the relevant thresholding interval [x, y].

In a step 43, a test is performed to determine whether there exists thresholding intervals which have not been considered. If the test is positive the values of (x, y) are incremented in a step 44, and steps 41 to 43 are repeated. If the test is negative, the maximum value QA of the disparity QA (x, y) between the two probabilities is sought in a step 45.

In a step 46, the optimum values of the thresholding boundaries for area A are defined. These optimum values are those which make it possible to obtain the maximum value of QA of the quality of the marking of area A.

The expression for the maximum value QA is the following:

QA=sup [PA (x,y)–k PB (x,y]

k being a weighting coefficient which makes it possible to enhance the magnitude of the probability for area B relative to area A and to enhance the safety of separation of areas A and B.

In the example represented in FIGS. 4a, 4b and 4c, x and y are equal respectively to 0 and g for area A, and to d and 255 for area B.

The value of g which makes it possible to obtain a large marker characteristic unique to area A is determined by successive approximations by considering the disparity between the two probabilities PA (0,g) and PB (0,g) associated with the quality of the marker ZA for area A corresponding to the relevant thresholding interval [0,g], and by searching for the maximum QA of this disparity as a function of the value of g.

The expression for the maximum value QA of the quality of the marker ZA is the following:

QA=sup [PA (0,g)–k PB (0,g)]

In the example of FIGS. 4a, 4b and 4c, the value of k has been chosen to be 50.

In the same way, the value of the boundary d, d being greater than g, is obtained by searching for the maximum, as a function of d, of the quality QB of the marker ZB associated with area B, the expression for QB being as follows:

QB=sup [PB (d,255)–k PA (d,255)]

The example described with reference to FIGS. 4a, 4b and 4c and to FIG. 5 relates to the marking of two areas. The marking process in accordance with the invention can be applied to numbers of areas greater than two by processing the areas in pairs in a similar manner.

Markers are defined for all the possible combinations of pairs of areas by determining, for each pair of areas, the thresholding boundaries for the areas by optimizing a quality parameter of the markers for these areas.

In general, for a given image, the thresholding boundaries for the various areas are determined on different transformed images obtained after using several transformations for simplifying the relevant image. The final marker Zi for an area i is then determined by intersecting all the thresholded images corresponding to area i.

In the case in which the same transformation allows several areas of the image to be distinguished, several thresholdings may be performed in the transformed image obtained, each thresholding relating to a specified pair of areas. In this case, for this relevant transformed image, the thresholding boundaries for a given area i are obtained by considering all the thresholding intervals in which the area i occurs and by calculating the maximum and minimum of the corresponding thresholding boundaries.

When all the markers for the various areas of the reference images belonging to the learning base have been defined and optimized, the values of the thresholding boundaries are frozen and the most effective simplifying transformations, for which the quality parameter of the markers is greatest, are selected. The learning phases are then terminated and the third phase of the process then involves using the selected simplifying transformations and the values of the thresholding boundaries fixed during the second phase to mark, completely automatically, areas in new images of mechanical components not belonging to the learning base. The automatic marking of the areas in a new image is performed by applying in succession to the new image the various selected simplifying transformations and the various thresholdings whose boundaries were fixed during the second phase. The markers for each area are then obtained by intersecting the thresholded images corresponding to one and the same area.

After the marking operation, the new images are segmented by means of the watershed line (WSL) method.

We claim:

1. A process for automatic detection of assessable areas in an image of a mechanical component, comprising the steps of:

performing a marking of assessable areas of a new image; and determining the exact outline of said assessable areas by using a method called the watershed line method;

wherein said marking step consists of:

a first phase comprising the step of performing manual segmentation of at least one reference image in order to detect different areas of said at least one reference image, said different areas corresponding to the assessable areas of the new image;

a second phase comprising the steps of:
defining and applying at least one simplifying transformation to said at least one reference image,
determining and optimizing thresholding intervals for said different areas of said at least one reference image, said thresholding intervals corresponding to markers characteristic of each different area, and
fixing the optimized thresholding intervals;

a third phase comprising the step of performing the automatic marking of the assessable areas of the new image by successively transforming said new image using said at least one simplifying transformation and performing thresholding with said optimized thresholding intervals fixed during said second phase to generate thresholded images, and by intersecting the thresholded images to generate markers corresponding to the assessable areas of the new image.

2. The process as claimed in claim 1, wherein said at least one simplifying transformation applied to said at least one reference image is selected so as to accentuate a contrast or a difference between at least two areas of said at least one reference image.

3. The process as claimed in claim 2, wherein, for a given reference image, said thresholding intervals for said different areas are determined in said second phase from histograms of each different area and in such a way as to optimize, for each different area, parameters representative of the quality of separation between each different area and the other different areas of said at least one reference image.

4. The process as claimed in claim 3, wherein said thresholding intervals for said different areas are determined by successive approximations, said different areas being considered in pairs.

5. The process as claimed in claim 4, wherein, for a given area A of said different areas, the parameter representative of the quality of separation between said area A and a second area B of said different areas is the disparity between the probability that an image point of area A belongs to the relevant thresholding interval and the probability that an image point of area B does not belong to the relevant thresholding interval.

6. The process as claimed in claim 5, wherein, for a given of said at least one reference images, said thresholding intervals for the different areas are determined after using simplifying transformations, and wherein, for each different area, the final marker is determined by intersecting all the corresponding thresholded images.

* * * * *